March 29, 1932.  R. J. TEETOR  1,851,738

METHOD AND APPARATUS FOR HEAT TREATMENT

Filed Oct. 20, 1930  3 Sheets-Sheet 1

Inventor:
Ralph J. Teetor
By Rector, Hibben, Davis & Macauley
Attys

March 29, 1932. R. J. TEETOR 1,851,738
METHOD AND APPARATUS FOR HEAT TREATMENT
Filed Oct. 20, 1930 3 Sheets-Sheet 2
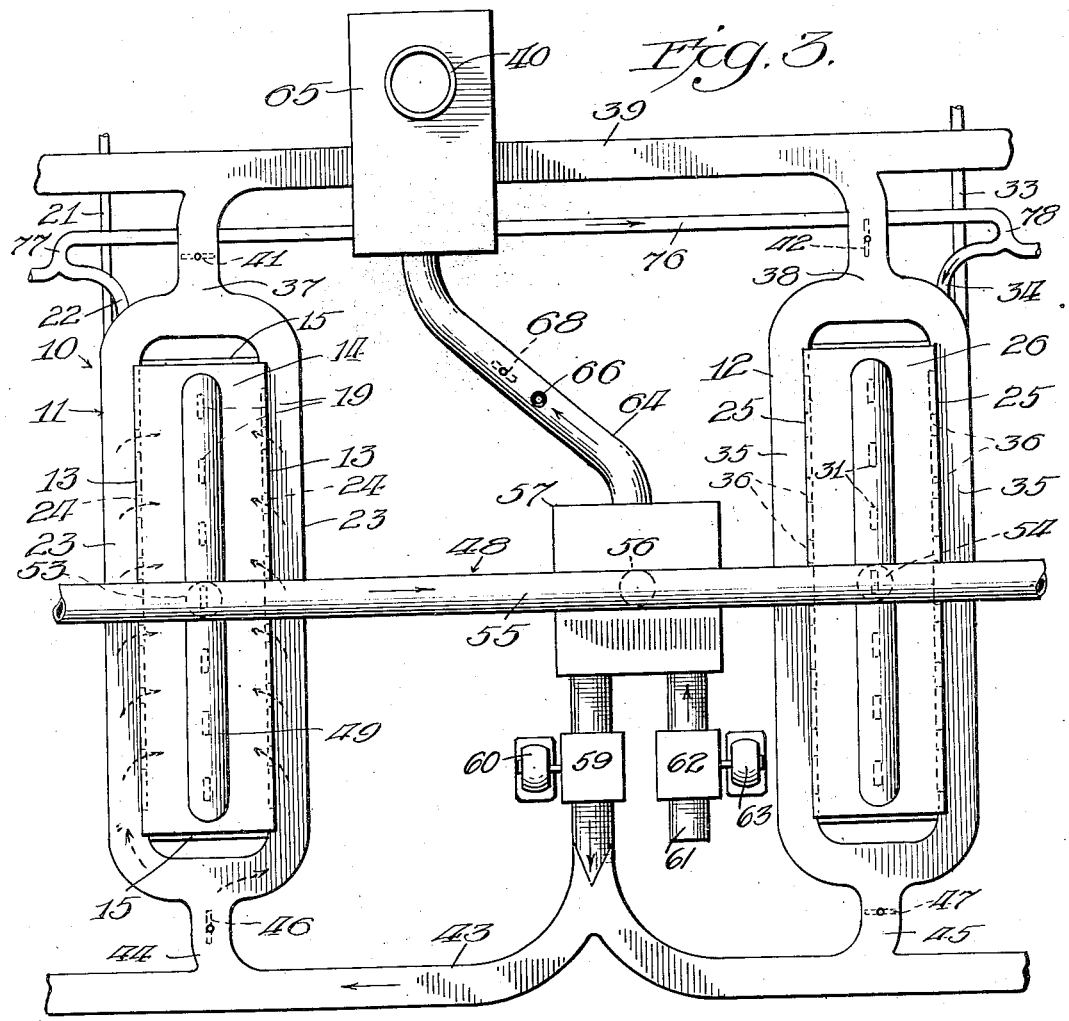
Inventor:
Ralph J. Teetor.
By Hector, Hibben, Davis & Macauley
Attys

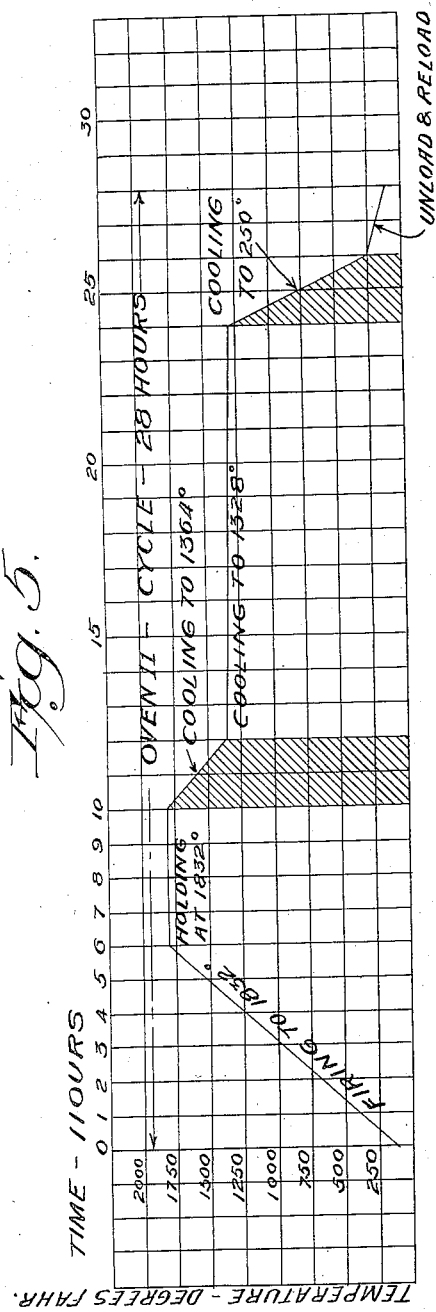
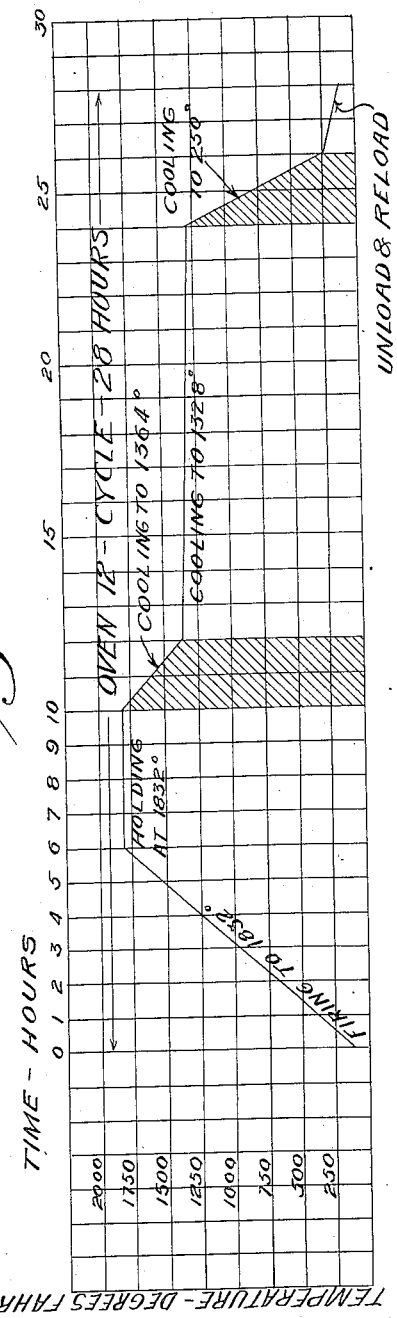

Patented Mar. 29, 1932

1,851,738

UNITED STATES PATENT OFFICE

RALPH J. TEETOR, OF CADILLAC, MICHIGAN

METHOD AND APPARATUS FOR HEAT TREATMENT

Application filed October 20, 1930. Serial No. 489,719.

My invention relates to a method and apparatus for heat treatment of various products generally, but is concerned more particularly with the annealing or otherwise heat treating of malleable iron castings with a view of shortening the time of the operation, improving the quality of the product, and effecting a reduction in the unit cost.

One object is to devise a method of heat treatment in which the products are retained within the oven throughout, certain cooling phases of the treatment being accomplished by establishing a closed circulation with a heat exchanger, generally considered, whether a recuperator, boiler economizer, or other unit having similar characteristics from the standpoint of heat absorptive capacity, with a consequent reduction in the oxidizing effect on the pots and castings as would otherwise result if the cooling were effected by introducing external air or air from other oven units.

A further object is to devise a method of heat treatment which utilizes a battery of fuel fired ovens, any number of which may be connected at desired stages in the heat treatment with one or more of the remaining ovens through a heat exchanger unit, the heat transferred through this unit serving to heat the combustion air for the last named oven.

A further object is to devise a method of heat treatment which utilizes a battery of ovens associated with a recuperator for abstracting heat from one or more ovens during determined cooling stages of the treatment and with a second recuperator through which the ovens of the battery communicate with the stack, thereby providing an arrangement in which a certain portion of the heat, either during the firing or the cooling of one or more ovens, may be conserved for the benefit of the other oven units.

A further object is to devise a heat treating method which is intended to provide a maximum continuity of operation for a plant composed of a plurality of oven units through a novel arrangement of connecting the latter for joint action at certain stages of the heat treatment.

A further object is the arrangement of a battery of heat treating ovens which are connected for an exchange of heat at certain stages in the heat treatment by establishing a circulatory action of the hot gases through a recuperator, the heat transferred through the latter unit being utilized for heating the combustion air for other ovens being fired, thereby increasing the overall heat efficiency of the battery.

A further object is to devise an annealing oven which is constructed and arranged in combination with the recuperator unit to secure a rapid and uniform cooling of the contents of the oven upon the completion of the major step of the heat treatment.

A further object is to devise an annealing oven which is constructed and arranged in combination with a recuperator unit so that the combustion air for the oven may be passed through said unit and be pre-heated prior to its introduction into the burning space of the oven.

For the purpose of discussion, my improved method and apparatus will be described as specifically applied to the annealing of malleable iron castings, but it will be understood that the central conception is susceptible of general adaptation in the heat treatment of metal or other products requiring the application of heat.

As annealing is now practiced in the industry with fuel fired ovens, the castings are packed in annealing pots and the latter are stacked in rows within the ovens. Hot gases are then introduced into the oven, generally at one end thereof, passing above the stands of pots, down therebetween, and along the bottom of the oven for discharge through flues which may be variously arranged along the bottom. In the larger types of ovens, it requires from eighteen to forty-eight hours, dependent upon the characteristics of the castings and the nature of the firing, to bring all the pots up to a temperature of approximately 1600° F. which is considered to be the safest maximum for ovens operating on the above noted principle. Even under these conditions, the pots nearest the entrance of the hot gases acquire a temperature which is higher than the annealing temperature for this type of annealing operation, with a manifest waste of heat and a frequent impairment of the castings in such locations. The annealing temperature must then be maintained for a period of from forty-eight to sixty hours in order to insure that the large body of castings reaches the required temperature, during which time, one of the chief operating problems resides in the control of the combustion with a view of eliminating all or substantially all excess air which oxidizes the pots and castings, causing scaling and other deteriorating effects. A further objection to the type of oven under consideration is that no provision is made for the rapid, uniform cooling of the oven contents upon the expiration of the required heating period, the oven being simply cooled by radiation for a period of from two to four days depending upon its size. When opened, the temperature of the hottest pots will be about 1328° F., while that of the outer pots will be as low as 800° F., thus indicating the entire absence of any uniformity in cooling.

From the above, it will be apparent that it is not only desirable to hasten the annealing cycle from the standpoint of a saving in time and an improvement in quantity output, but also for the purpose of improving the quality of the castings, and of effecting fuel economy by promoting a more efficient heat exchange.

It is one of the principal objects of the present invention to accomplish the foregoing result by substantially approximating a so-called perfect annealing cycle for malleable iron castings through the use of an improved type of oven and a novel method of arranging the same in connected operative sets in combination with certain recuperator units through which heat is exchanged between indicated ovens by a transfer of heat from the hot oven through the unit for the purpose of heating the combustion air being delivered to the relatively cooler oven. For purpose of description, a suggested cycle consists in firing the oven for about six hours until its contents reach a temperature of approximately 1832° F., maintaining this temperature for about four hours, then cooling quickly in about two hours to a temperature of 1364° F., then further cooling slowly, usually by radiation, through a twelve hour period to a temperature of 1328° F., and then cooling as rapidly as possible down to a temperature of about 250° F. which requires about two hours additional, after which the pots may be removed and the oven recharged, the last step requiring about two hours, whereupon this particular oven is again ready for the first six hour firing phase. The temperature and times noted above will be regarded as approximate only and as being subject to variation as desired. The outstanding advantage of this cycle is its rapidity and economy of heat, since the total time required is only twenty-eight hours, as compared with a total of one hundred and sixty-eight hours using the methods and furnaces now common in the industry, a certain proportion of the heat normally wasted through the stack during the firing of any one of the ovens being conserved by the use of a stack recuperator unit through which combustion air is passed and heated for return to the oven in question, while by the use of a second recuperator unit, an oven which has completed its firing phase may be cooled by transferring a portion of its heat through said second unit to the combustion air being delivered to a second oven which is later in point of heat treatment time, the heat transfer in the latter case being achieved by establishing a closed circulation of the gases in the hot oven through the second recuperator.

The arrangement of the ovens and their inter-connections permit of ready adaptation to a wide variety of heat treatment cycles, whether of the nature suggested above or radically distinct therefrom. In any one oven, any temperature may be maintained for any length of time and this condition may be quickly and uniformly changed throughout the oven, whether in the nature of an increase or a decrease in temperature.

In the case of malleable iron castings, that phase of the treatment during which the products are subjected to a temperature of 1832° F. for four hours, results in a breakdown of the cementite structure, or a chemical separation of the temper carbon and the iron, as expressed by the equation: $Fe_3C = 3Fe + C$. During the cooling phase of twelve hours which reduces the temperature from 1364° F. to 1328° F., the product passes through the so-called critical range when the new composition of iron and temper carbon becomes stabilized. There is no chemical reaction or mechanical change in the product during the two hour reduction in temperature from 1832° F. to 1364° F., which may, therefore, be effected with rapidity, as may also the cooling upon the completion of the twelve hour phase to 1328° F., since the product at this time is stabilized.

The advance made by the present invention involves more than a mere increase in the annealing temperature since the attainment of the high temperature noted above is impossible in the present type of ovens, for the temperature of the pots nearest the source of heat would then be over 2000° F., a condition which would be destructive both to the pots and to the castings. The improved type of oven described more fully hereinafter permits the use of a high annealing temperature by providing for an extremely efficient circulation of the hot gases and intimate contact thereof with the pots uniformly throughout the oven. The same internal arrangement is availed of during the cooling phase of the heat treatment, in connection with the recuperator unit, to secure a controlled removal of heat from the oven with a minimization of any tendency to oxidize the pots or the castings.

These and further objects of my invention will be set forth in the following specification, reference being had to the accompanying diagrammatic drawings, and the novel means by which said objects are effectuated will be definitely pointed out in the claims.

In the drawings:

Fig. 3 is a diagrammatic view corresponding to Fig. 1 and showing by means of arrows the direction of heat flow during certain stages of the heat treatment.

Fig. 4 is a vertical sectional elevation of the stack recuperator unit, which is intended to be generally descriptive of devices of this character whether associated with a stack, or located in other positions.

Figs. 5 and 6 are graphical analyses of the method of heat treatment for the oven units shown in Fig. 1, plotted on a temperature-time diagram and showing the various phases for the two ovens, the diagram for the right oven, as viewed in Fig. 1, being shifted toward the right to illustrate the difference in the heat treatment times of the two ovens.

Fig. 7 is an enlarged section along the line 7—7 in Fig. 1, looking in the direction of the arrows, and showing the damper construction whereby air which is pre-heated by passage through one of the recuperators may be delivered to the atmosphere.

Figure 1:
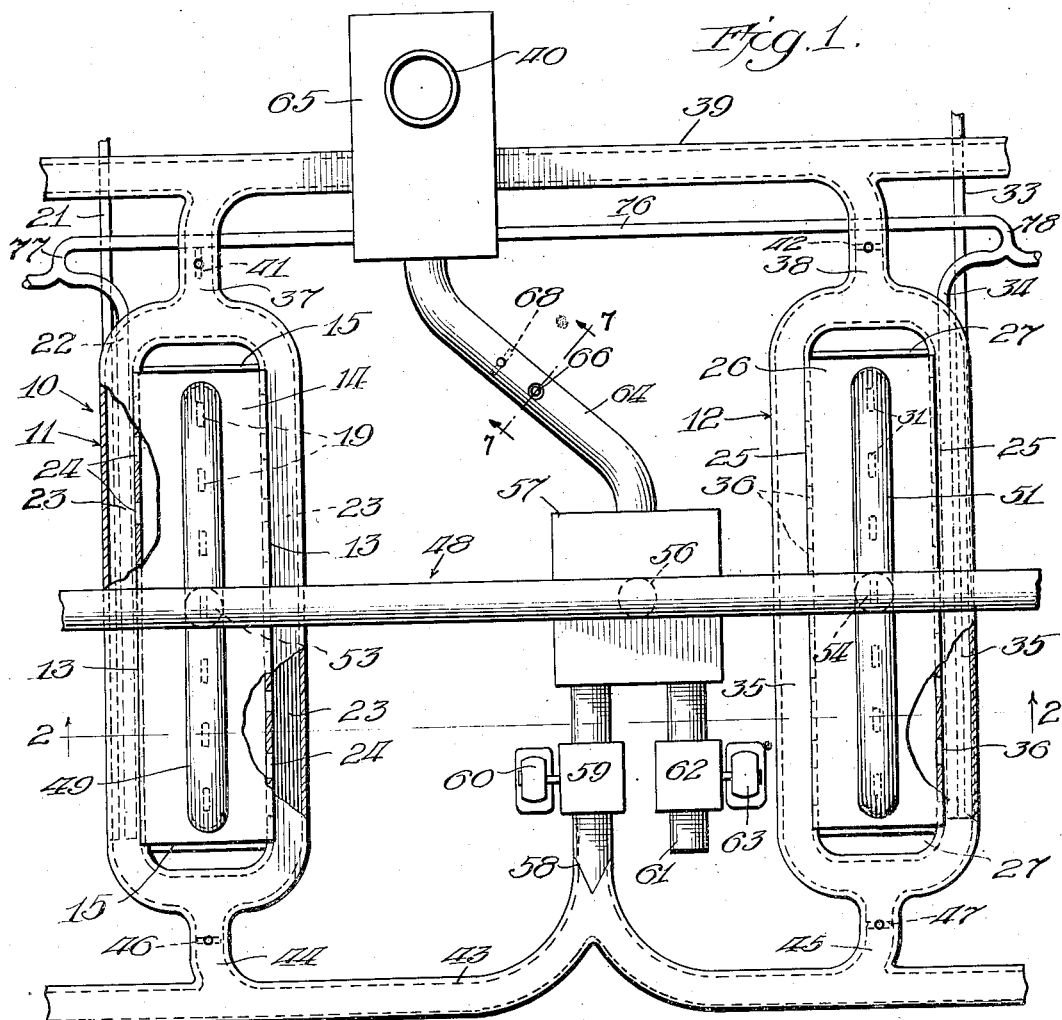
Figure 1 is a plan view, partly in section showing one arrangement of my improved heat treating apparatus including a pair of oven units and the necessary recuperators.

The numeral 10 designates one suggested form of arrangement of my improved heat-treating apparatus and comprises the oven units 11 and 12 which are disposed side by side and are of a generally elongated, rectangular outline, although the precise shape thereof forms no part of the present invention. The oven 11 is defined by side walls 13—13, a roof 14, end walls 15—15, either or both of which may be hinged or otherwise removable to permit insertion of the castings within the oven, and a floor 16. Said floor rests on a base 17 within which is formed a firebox 18 of any desired shape which extends substantially the full length of the oven 11 and which communicates with the interior thereof by means of a plurality of inlet ports 19 which are uniformly distributed along the longitudinal center line of the floor 16. A supply of heat within the firebox 18 may be established by means of nozzles 20, distributed along the base 17, which are connected to a source of fuel supply 21 and to a source of air supply 22, the latter being connected to certain recuperator units as described more fully hereinafter. The oven 11 is also provided with a pair of exhaust flues 23—23 which extend lengthwise thereof and each of which is disposed in offset relation adjacent the lower edge of a side wall 13, communication between said flues and the interior of the oven 11 being established by means of exhaust ports 24 which are distributed uniformly along the lower edge of each side wall 13 in suitable locations.

The oven 12 is formed similarly to the oven 11 and comprises side walls 25, a roof 26, end walls 27, likewise hinged or otherwise removable, and a floor 28. The floor 28 rests on a base 29, within which is formed a firebox 30 which has communication with the interior of the oven 12 by means of a plurality of inlet ports 31 which are uniformly distributed along the longitudinal center line of the floor 28. Heat is supplied to the firebox 30 by means of nozzles 32 distributed along the base 29, which in turn are fed from a source of fuel supply 33 and a source of air supply 34, the latter being connected to the recuperator units to which reference will hereinafter be made. A pair of exhaust flues 35—35 extend lengthwise of the oven 12 on each side thereof adjacent the lower edge of each side wall 25 in offset relation thereto and communication between said flues and the interior of said oven is established by means of a plurality of exhaust ports 36 which are likewise uniformly distributed along the lower edges of said side walls.

At one end of the apparatus, the exhaust flues 23—23 connect with a branch pipe 37 and the exhaust flues 35—35 connect with a similar branch pipe 38, all of said branches being arranged as part of an exhaust manifold 39 which communicates with a stack 40. Communication between the flues 23 and branch 37, and between the flues 35 and the branch 38 is controlled by means of dampers 41 and 42, respectively.

At the other end of the apparatus is provided a circulating manifold 43 which connects by means of a branch 44 with the adjacent ends of the exhaust flues 23—23, and with the exhaust flues 35—35 by means of a branch 45. A damper 46 is provided in the branch 44 and a damper 47 is provided in the branch 45 for a purpose hereinafter explained. As shown in Fig. 1, the manifolds 39 and 43 are shown as extending in opposite directions from the ovens 11 and 12 for connection to such other oven units as it may be desired to include within the battery, but for the purpose of the present disclosure, it is deemed sufficient to refer to only the two ovens shown in said figure, as the nature of the operative method, where other oven units are included, is identical with that presently explained except that the other units will differ in point of heat treatment time.

Bridged between and over the roofs of the ovens 11 and 12 is a manifold 48 which may also extend in opposite directions from said ovens in a manner similar to the manifolds 39 and 43, and said manifold 48 is provided with a branch 49, closed at both ends, which extends lengthwise of the oven 11 and communicates with the interior thereof by means of an elongated duct 50 which passes through the roof 14 of said oven. Similarly, the manifold 48 also comprises a branch 51, closed at both ends, which extends lengthwise of the oven 12 and communicates with the interior area by means of an elongated duct 52 which passes through the roof 26 of said oven. Communication between the branch pipes 49 and 51 and the portion of the manifold 48 which is bridged between the ovens 11 and 12 is controlled by means of dampers 53 and 54, respectively. The manifold portion between said ovens will be designated by the numeral 55 and at some convenient point intermediate the branches 49 and 51, the cross pipe 55 connects by means of a branch 56 with a recuperator 57 of approved design. Leading from the recuperator 57 in communication with the branch pipe 56 is a branch pipe 58 which connects with the manifold 43 and along the branch pipe 58 may be located a fan 59 which is driven by any suitable source of power, such as the motor 60. The internal structure of the recuperator 57 forms no part of the present invention, but for purpose of illustration may assume the general arrangement as will be hereinafter described for the recuperator which is associated with the stack 40, as shown in Fig. 4. From the foregoing, it will be understood that, when the fan 59 is in operation and the proper dampers are closed, it is impossible to establish a closed circulatory path between the oven 11 and the recuperator 57 by way of the manifold 48, branch pipe 58, manifold 43 and branch pipe 44.

Figure 2:
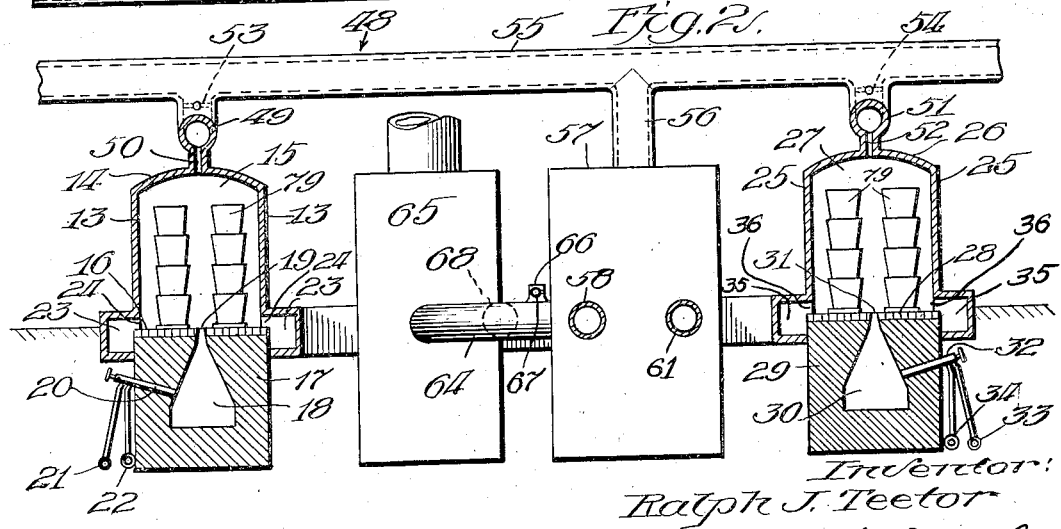
Fig. 2 is a section along the line 2—2 in Fig. 1, looking in the direction of the arrows, and showing the internal arrangement of the oven units with the annealing pots positioned therein.

The recuperator 57 is also supplied with external air through a pipe 61 which includes a fan 62 driven by any source of power, such as a motor 63, and the air so supplied to said recuperator passes therefrom through an intermediate pipe 64 which connects with one side of a recuperator 65 operatively associated with the flue passages to the stack 40. The intermediate pipe 64 is provided with an exhaust pipe 66 communicating with the atmosphere whose opening may be closed by a damper 67 (see Fig. 2). On the side of the exhaust pipe 66 adjacent the recuperator 65, the pipe 64 is provided with a damper 68 for a purpose hereinafter explained.

The internal structure of the recuperator 65 is illustrated more or less diagrammatically in Fig. 4 and it comprises the stack portion 40 which, at some convenient point, on opposite sides thereof has attached thereto an enclosure 69. A septum 70 is bridged between one wall of the stack 40 and the adjacent wall of the enclosure 69 to thereby establish three compartments 71, 72 and 73, the chambers 71 and 73 being located on the same side of the stack 40, but on opposite sides of the septum 70, while the chamber 72 is positioned on the opposite side of said stack from both of the other chambers. Communication between the chambers 71 and 72 is provided by a plurality of tubes 74 which extend between opposite walls of the stack 40 and are accordingly subjected to the hot gases passing through said stack. Similarly, the chamber 72 communicates with the chamber 73 through a plurality of tubes 75, also extending between opposite walls of said stack and which are disposed below the plane of the septum 70, said last named tubes also being subjected to the hot gases passing through the stack 40. The intermediate pipe 64 from the recuperator 57 enters the chamber 71 and from the chamber 73 leads a manifold 76 which communicates by means of the branch pipes 77 and 78 with the pipes 22 and 34 which supply the combustion air to the ovens 11 and 12, respectively. Accordingly, the air which is received from the recuperator 57 pursues a circuitous path in moving through the recuperator 65, twice crossing the path of the flue gases passing through the stack 40 with the result that the temperature of said air is raised. Substantially the same internal structure may be employed for the recuperator 57, so that in each recuperator unit, the hot gases passing therethrough may lose their heat to the relatively cooler gases without coming in actual contact therewith.

Assuming that the castings to be heat treated are packed in the usual annealing pots 79, said pots will be arranged within the ovens 11 and 12 in a plurality of stacked stands which are disposed in two rows spaced from each other on opposite sides of the inlet ports 19 and 31 and also spaced from the side walls 13—13 and 25—25 in the respective ovens.

The oven 11 having been fully closed, the first step in the heat treatment consists in raising and holding the content thereof to and at a temperature of about 1832° F., which requires a total of about ten hours, including six hours of firing to the maximum temperature and a maintenance of this temperature for approximately four hours. Prior to igniting the burners or nozzles 20, the damper 41 will be opened and the dampers 42, 46 and 53 will be closed, thus isolating the oven 11 for the purpose of the present phase of the operation. The motor 63 will then be placed in operation in order to establish suction through the pipe 61 and accordingly a supply of combustion air through the recuperator 57, the intermediate pipe 64, the recuperator 65, the manifold 76, the branch 77 and the pipe 22 leading to the burners 20, the dampers 67 and 68 occupying a closed and opened position, respectively, and the nozzles 32 being closed to prevent passage of air along the pipe 34. The burners 20 then having been ignited, the hot gases of combustion will pass upwardly from the firebox 18 through the inlet ports 19 into the interior of the oven 11. Continuing upward, the gases will divide after striking the inner surface of the roof 14 and will be directed in two streams downwardly between the rows of pots 79 and the inner surfaces of the side walls 13, finally reaching the exhaust ports 24 from which they pass into the exhaust flues 23 and then to the branch 37 of the exhaust manifold 39 for final delivery to the stack 40 through the recuperator 65. After the oven 11 has been fired for a short time, the gases passing through the stack 40 will have attained a sufficient temperature so that there will result a heat transfer through the recuperator 65 to the combustion air being pumped through said recuperator by the fan 62, with certain economies obtainable in the course of operation by reason of the increase in temperature of said air.

The next step in the heat treatment of the contents of the oven 11 consists in cooling the same quickly down to a temperature of about 1364° F., which step is accomplished in about two hours time. The manner of accomplishing this reduction in heat of the contents of the oven 11 and at the same time utilizing the heat so transferred to preheat the combustion air for the oven 12 is illustrated diagrammatically in Fig. 3.

Briefly, the heat exchange between the ovens 11 and 12, the later being fired at this time, is effected by establishing a closed circulatory system between the oven 11 and the recuperator 57, the heat transfer occurring within said recuperator to preheat the air being passed therethrough by the fan 62.

Before discussing this heat transfer in detail, it will be understood by referring to Figs. 5 and 6 that the firing of the oven 12 was commenced approximately three hours after the beginning of the firing of the oven 11, the damper 42 having been opened for this purpose and the dampers 47 and 54 closed, thus isolating the oven 12 from the remainder of the apparatus except for communication with the stack 40 through the recuperator 65. Accordingly, during the common period of firing, as shown in Figs. 5 and 6, preheated combustion air will be supplied to both sets of the burners 20 and 32 through the medium of the recuperator 65. When the oven 11 reaches the end of its firing phase, the oven 12 is in the midst of the portion of its firing phase consisting in the maintenance of the temperature of its contents at substantially 1832° F., so that when it becomes necessary to cool the contents of the oven 11, it is possible to do so by transferring a portion of the heat contained within the oven 11 to the combustion air being delivered to the oven 12 and the arrangement for accomplishing this result will now be described.

The oven 11 having reached the end of its firing phase, the burners 20 are extinguished, the damper 41 is closed, and the dampers 46 and 53 are opened, as shown in Fig. 3, thus denying communication of said oven with the stack 40 and establishing communication between the interior of said oven and the recuperator 57 through the cross pipe 55 and the manifold 43. The fan 59 will then be placed in operation to establish a closed path of the hot gas contents of the oven 11 through the recuperator 57, while the latter is also having combustion air passed therethrough by a separate but heat communicating path, so that during the two hour period of this closed circulatory system, a portion of the heat confined within the oven 11 will be transferred to the air passing through the recuperator 57 so that the temperature of the contents of the oven 11 will finally be cooled down to approximately 1364° F. Tracing the general direction of this closed path and referring to Figs. 2 and 3, it will be noted that, beginning with the fan 59, the gases pass through the manifold 43, branch pipe 44, thence dividing to paths along the exhaust flues 23—23, thence through the several ports 24, upwardly between the walls 13 and the stacked rows of pots 79, thence upwardly through the duct 50 into the branch 49, thence along the cross pipe 55 for passage through the recuperator 57 and so back to the fan 59. It will be noted that, in passing through the oven 11, the closed system of circulation pursues the normal course of heat flow in that movement of the gases is from the bottom to the top of the oven.

The desired temperature reduction in the oven 11 having been effected, the motor 60 is stopped and the dampers 46 and 53 closed, the damper 41 having already been closed, during the period of circulation between said oven and the recuperator 57, so that the former is again isolated from the remainder of the apparatus. The oven 11 is then permitted to cool slowly by radiation over a period of about twelve hours down to a temperature of approximately 1328° F., while in the oven 12, the firing phase is continuous for an additional hour (see Figs. 5 and 6) after the completion of the cooling phase for the oven 11, as just described. At the end of the hour indicated, which marks the completion of the firing phase for the oven 12, the latter is ready for its rapid cooling phase and the method of achieving the same will now be described.

By referring to Figs. 5 and 6, it will be observed that since at this time, the oven 11 is undergoing its cooling phase by radiation, it is impossible, in the arrangement of the two ovens as shown in Fig. 1, to cool the contents of the oven 12 by transferring a portion of the heat thereof to combustion air passing through the oven 11, since the latter is not being fired. However, in a battery comprising more than two ovens, it is contemplated that the heat treatment times will be arranged so that there will always be one oven being fired during the time when the requirements of the heat treatment necessitates the cooling of another oven of the battery. Such an oven would then occupy in point of heat treatment time with reference to the oven 12, the same relation as is shown diagrammatically in Figs. 5 and 6 which shows a corresponding relation between the ovens 11 and 12.

In the twin oven batteries shown, however, the burners 32 are extinguished, the dampers 42 and 68 are closed, and the dampers 47, 54 and 67 are opened, thus denying communication of said oven with the stack 40, establishing communication between said oven and the recuperator 57 by way of the cross pipe 55 and the manifold 43, and establishing communication between the recuperator 57 and the atmosphere through the intermediate pipe 64 and the pipe 66. The fan 62 is running at this time, because hitherto it had been employed to pump combustion air to the oven 12, so that no change is required in this part of the apparatus. The fan 59 will then be placed in operation to establish a closed circulation of the hot gas content of the oven 12 through the recuperator 57 and return to said oven, the path of the gas travel being generally as indicated in connection with the oven 11, namely through the branch pipe 45 and upwardly through the oven 12 and thence through the cross pipe 55 to the recuperator 57. The heat which is extracted from the circulating hot gases in the recuperator is absorbed by the air which is being pumped therethrough by the fan 62 and said heated air is delivered to the atmosphere through the exhaust pipe 66 in the two oven battery shown, but this heated air could be utilized as combustion air for another oven as indicated above. This condition of operation continues until the two hour cooling phase is completed, whereupon the fan 59 is stopped, and the dampers 47 and 54 closed, the damper 42 having already been closed during the period of circulation, so that the oven 12 is again isolated from the remainder of the apparatus for its cooling phase by radiation. The fan 62 is also stopped, because at this time, there is no demand for combustion air by either of the ovens 11 and 12, although, as noted above, it is contemplated that, with the addition of other ovens, there would be a demand for such air during the firing phase of such other ovens, or during the rapid cooling phase of other of said ovens. The cooling phase by radiation of the oven 12 likewise covers a period of about twelve hours down to a temperature of approximately 1328° F. and as shown in Figs. 5 and 6, nine hours of this time coincides with a like portion of the radiation cooling time of the oven 11.

Upon the completion of this nine hour period, which also marks the end of the twelve hour radiation cooling period of the oven 11, the contents of the latter are cooled rapidly down to a temperature of approximately 250° F. in about two hours time and the method for achieving this result will now be described.

The damper 41 is maintained closed, and the dampers 46 and 53 are opened, the dampers 66 and 68 having already been opened and closed, respectively, in order to rapidly cool the oven 12. The fan 59 is then placed in operation to reestablish the closed circulatory path above described through the recuperator 57 and the oven 11, and the fan 62 is also placed in operation to pump air through said recuperator and then to the atmosphere through the exhaust pipe 66, the necessary heat transfer occurring in said recuperator for absorption by the air being pumped therethrough, which transferred heat is in turn exhausted to the atmosphere.

Upon the completion of this two hour cooling phase, the contents of the oven 11 are sufficiently reduced in temperature to permit the latter to be opened for unloading and reloading. The fan 59 is accordingly stopped and the fan 62 is also stopped, since the oven 12 is still in the midst of its cooling phase by radiation (see Figs. 5 and 6). The unloading and reloading phase for the oven 11 requires approximately two hours and at the end of this period, the heat treating method is resumed for said oven with the successive steps as above described.

In the midst of the unloading and reloading phase of the oven 11, the radiation cooling phase of the oven 12 is completed, so that said oven is then ready to have its contents reduced in temperature sufficiently to permit the opening of the oven. Accordingly, the dampers 47 and 54 are opened, the dampers 67 and 68 remain opened and closed, respectively, and the fans 59 and 62 are again placed in operation to transfer the heat to the atmosphere. However, upon completion of the unloading and reloading phases of oven 11, the dampers 67 and 68 are preferably closed and opened, respectively, since, at this time, it is possible to conserve the heat within the oven 12 by transferring the same to the combustion air being delivered to the oven 11, the latter then being in the early stages of its firing phase. The fan 59 will then establish a closed circulatory path between the oven 12 and the recuperator 57, as above described, and the fan 62 will likewise be placed in operation to establish a flow of combustion air through said recuperator, said air absorbing heat in passing through said recuperator from the gas content of the oven 12 which is being circulated through said recuperator. As before, this cooling phase of the oven 12 is maintained for a period of about two hours until the contents thereof attain a temperature of approximately 250° F., whereupon the fan 59 is stopped, and the oven 12 is unloaded and reloaded over a period of about two hours, whereupon it resumes its heat treating cycle as above described.

The foregoing arrangement of oven units not only effects the desired uniform cooling and heating of the contents thereof, but the method of handling the same during certain phases of the heat treatment in both units results in a marked saving in time over methods now in use, as well as accomplishing a notable heat economy, since a portion of the heat for any one unit is obtained by drawing upon the contents of another unit which is in an earlier stage of the heat treatment. The cooling of the oven content by establishing a closed, circulatory path of the hot gases through a heat absorptive unit, such as a recuperator, constitutes one of the marked advantages of the invention, since the cooling is accomplished without utilizing external air, or air from another oven unit, thereby greatly minimizing the oxidation of the pots and castings, which would otherwise promote scaling and other detrimental effects. The nature of the heat cycle, when considered with respect to a battery of oven units, enables the latter to be handled with considerable degree of flexibility, since the cooling of any one unit may be wholly independent of the heating of another. It will be obvious that the temperature and time factors of the cycle as above described may be varied as may appear desirable, dependent upon the conditions of operation and the nature of the work being handled, and also that numerous changes may be made in the details of the oven units, as well as in the connecting flues, while maintaining the desired requisites in other respects.

While I have shown one set of elements and combinations thereof for effectuating my improved method and the apparatus for carrying out the same, it will be understood that the same is intended for the purpose of illustration only and in nowise to restrict my arrangement to the exact forms and structures shown, for many changes may be made therein without departing from the spirit of my invention.

I claim:

1. The method of heat treating products in groups which comprises supplying heat to one group for a predetermined period, abstracting heat therefrom by establishing a closed circulatory system through a heat exchanger, and transferring the exchanged heat to a second group of lower temperature.

2. The method of heat treating products in groups by subjecting them to heat from fuel firing which comprises supplying heat to one group for a predetermined period, abstracting heat therefrom by establishing a closed circulatory system through a heat exchanger, and preheating the combustion air for a second group by passing the same through said exchanger.

3. The method of heat treating products by subjecting them to heat from fuel firing which comprises establishing groups of the products, supplying heat to each of said groups beginning at different times, passing the hot gases discharged from each group through a heat exchanger, and preheating the combustion air for groups in the same and subsequent heating phases of the treatment by passing the same through said exchanger.

4. The method of heat treating products by subjecting them to heat from fuel firing which comprises establishing groups of the products, supplying heat to each of said groups beginning at different times, cooling each group by establishing a closed circulatory system through a heat exchanger, and preheating the combustion air for a group in a subsequent heating phase of the treatment by passing the same through said exchanger during the cooling phase of a prior group.

5. The method of heat treating products by subjecting them to heat from fuel firing which comprises establishing groups of the products, supplying heat to each of said groups beginning at different times, passing the hot gases discharged from each group through a heat exchanger, preheating the combustion air for groups in the same and subsequent heating phases of the treatment by passing the same through said exchanger, cooling each of the groups in the same heating phase by establishing a closed circulatory system through a second heat exchanger and preheating the combustion air for a group in a subsequent phase of heat treatment by passing the air through said second exchanger during the cooling phase of a prior group.

6. The method of heat treating products by subjecting them to heat from fuel firing which comprises establishing groups of the products, supplying heat to each of said groups beginning at different times, passing the hot gases discharged from each group through a heat exchanger, cooling each heated group by establishing a closed circulatory system through a second heat exchanger, and preheating the combustion air for a group in a subsequent heating phase of the treatment by passing the same successively through said exchangers.

7. The method of heat treating products by subjecting them to heat from fuel firing which comprises establishing groups of the products, supplying heat to each of said groups beginning at different times, constantly passing the discharging hot gases from at least one of said groups through a heat exchanger, constantly cooling at least one of said groups by establishing a closed, circulatory system through a second heat exchanger, and preheating the combustion air for a group in a subsequent heating phase of the treatment by passing the same successively through said exchangers.

8. The method of heat treating products by subjecting them to heat from fuel firing which comprises establishing groups of the products, supplying heat to each of said groups beginning at different times, passing the hot gases discharged from each group through a heat exchanger, cooling each group by establishing a closed circulatory system through a second heat exchanger, the discharge of hot gases from one group through said first exchanger being concurrent with the cooling of another group by said second exchanger, and preheating the combustion air for a group in a subsequent heating phase of the treatment by passing the same successively through said exchangers.

9. The method of annealing a metallic product which comprises subjecting it to heat from fuel firing, discharging the hot gases through a heat exchanger, and preheating the combustion air for the firing by passing the same through said exchanger.

10. An oven battery comprising a pair of oven units for heat treating products, means for heating each of said units, a heat exchanger associated with said units, and means for transferring heat from one of said units to the other through said exchanger.

11. An oven battery comprising a pair of oven units for heat treating products, means for heating each of said units, a heat exchanger associated with said units, fan means for establishing a closed circulatory flow through one of said units and said exchanger, and a second fan means for establishing a flow of the heat transmitted through said exchanger to said other unit.

12. An oven battery comprising a pair of oven units for heat treating products, fuel firing means for heating each of said units, a heat exchanger having a pair of passages, means of communication between one of said passages and each of said units for conducting hot gases to said exchanger and a second means of communication between the other of said passages and the firing means of each unit for delivering preheated combustion air thereto.

13. An oven battery comprising a pair of oven units for heat treating products, fuel firing means for heating each of said units, a heat exchanger having a pair of passages, means of communication between one of said passages and each of said units, fan means for establishing a closed circulatory flow of the confined gases through each of said units and exchanger to cool said units separately, means of communication between the other of said passages and the firing means of each of said units, and a second fan means for establishing a flow of combustion air through said exchanger to preheat the same for either of the firing means of said units.

14. An oven battery comprising a pair of oven units for heat treating products, fuel firing means for heating each of said units, a heat exchanger having a pair of passages, means of communication between one of said passages and each of said units, means for isolating either of said units as desired from communication with said exchanger, fan means positioned to establish a circulatory flow of the confined gases through said exchanger and the unit communicating therewith to cool the same, means of communication between the other passage of said exchanger and the firing means of said unit, and a second fan means for establishing a flow of combustion air through said exchanger to preheat the same for the firing means of said isolated unit.

15. An oven battery comprising a pair of oven units for heat treating products, fuel firing means for heating each of said units, a heat exchanger having a pair of passages, means of communication between one of said passages and each of said units for discharging hot gases through said exchanger, a second means of communication between the other of said passages and the firing means of each unit for delivering preheated combustion air thereto, a second heat exchanger having a pair of passages, means of communication between one of the passages of said second exchanger and each of said units, means for isolating either of said units as desired from communication with said second exchanger, fan means positioned to establish a circulatory flow of the confined gases through said second exchanger and the unit communicating therewith to cool the same, means of communication between the other passage of said second exchanger and the passage of said first exchanger communicating with the firing means of said units, and a second fan means for establishing a flow of combustion air successively through said exchangers to preheat the same for the firing means of said isolated unit.

16. An oven battery comprising a pair of oven units for heat treating products, means for heating each of said units, a heat exchanger associated with said units, and means including separately controllable circulatory systems for transferring heat from one of said units to the other through said exchanger.

17. An oven battery comprising a pair of oven units for heat treating products, means for heating each of said units, a heat exchanger associated with said units, fan means for establishing a closed circulatory flow through one of said units and said exchanger, and a second fan means for establishing a flow of the heat transmitted through said exchanger to said other unit, the circulating systems established by both of said fan means being separately controllable.

In testimony whereof, I have subscribed my name.

RALPH J. TEETOR.